(12) United States Patent
Yoon

(10) Patent No.: US 11,810,497 B2
(45) Date of Patent: Nov. 7, 2023

(54) TOUCH/DISPLAY DRIVING CIRCUIT AND DEVICE INCLUDING SAME

(71) Applicant: LX Semicon Co., Ltd, Daejeon (KR)

(72) Inventor: Seong Sik Yoon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/830,945

(22) Filed: Jun. 2, 2022

(65) Prior Publication Data

US 2022/0415241 A1 Dec. 29, 2022

(30) Foreign Application Priority Data

Jun. 25, 2021 (KR) .................. 10-2021-0082796

(51) Int. Cl.
*G09G 3/20* (2006.01)
*G06F 3/041* (2006.01)
*G06F 3/044* (2006.01)

(52) U.S. Cl.
CPC ......... *G09G 3/2092* (2013.01); *G06F 3/0412* (2013.01); *G06F 3/04166* (2019.05); *G06F 3/044* (2013.01); *G09G 2310/0289* (2013.01); *G09G 2330/023* (2013.01); *G09G 2354/00* (2013.01)

(58) Field of Classification Search
CPC .... G06F 3/044; G06F 3/04166; G06F 3/0412; G09G 2310/0289; G09G 2330/023; G09G 2330/021; G09G 2330/02; G09G 2354/00; G09G 3/2092
See application file for complete search history.

(56) References Cited

U.S. PATENT DOCUMENTS

| | | | |
|---|---|---|---|
| 2009/0085655 A1 | 4/2009 | Lin | |
| 2017/0102825 A1* | 4/2017 | Kim | ............... G06F 3/04166 |
| 2019/0121476 A1* | 4/2019 | Jang | ................... G09G 3/20 |
| 2020/0019270 A1* | 1/2020 | Shin | ............... G06F 3/04166 |
| 2021/0200414 A1* | 7/2021 | Lee | ................. G06F 3/0412 |

FOREIGN PATENT DOCUMENTS

| | | |
|---|---|---|
| KR | 20180020787 A | 2/2018 |
| KR | 20190045481 A | 5/2019 |

* cited by examiner

*Primary Examiner* — Hong Zhou
(74) *Attorney, Agent, or Firm* — POLSINELLI PC

(57) ABSTRACT

A power circuit according to the present disclosure may include a multiplexer connected to a first power line and a second power line and selecting and outputting one of a first voltage supplied through the first power line and a second voltage supplied through the second power line. Further, the power circuit may include a first power circuit which generates a first driving voltage and a second driving voltage by using a voltage supplied from the multiplexer, recognizes whether there is the first voltage supplied through the first power line, and does not output the first driving voltage when the first voltage is not recognized.

17 Claims, 8 Drawing Sheets

300

1100

TOUCH/DISPLAY DRIVING CIRCUIT AND DEVICE INCLUDING SAME

CROSS REFERENCE TO RELATED APPLICATION

This application claims priority from Republic of Korea Patent Application No. 10-2021-0082796, filed on Jun. 25, 2021, which is hereby incorporated by reference in its entirety.

BACKGROUND

1. Field of Technology

The present disclosure relates to a touch/display driving circuit and a device including the same.

2. Description of the Prior Art

Display devices configured to enable touch inputs on display screens (for example, touch/display devices) are applied to various electronic devices.

Touch/display devices may have touch panels attached to display panels (on-cell type), or may have touch electrodes embedded in display panels (in-cell type), thereby implementing various types of touch and display.

Some of common electrodes of a touch/display device may be used as touch electrodes so as to simultaneously implement touch and display within a single device. A single time interval may be time-divided into a display driving interval for transmitting image data to common electrodes and a touch driving interval for transmitting a touch driving signal to touch electrodes, thereby adjusting the operating cycle of touch and display.

In order to reduce power consumed by a display device, power needs to be supplied differently during a time interval for display to be performed by the display device and a time interval for touch driving. When the display device performs a display operation, power for touch sensing is consumed together. Furthermore, when the display device performs a touch sensing operation, power for display is consumed together. Accordingly, power consumed by the panel increases absent adjustment of power supplied regardless of the kind of operation of the display device.

Even if power for display driving and power for touch driving is separately supplied in the case of a display device, and if power for touch sensing is solely supplied without distinguishing between a circuit for touch driving and a circuit for display driving, the circuit for display driving may fail to operate correctly. A touch sensing circuit designed to enable both touch driving and display driving needs to be supplied with power stably regardless of the time-divided interval (display interval and touch interval).

SUMMARY OF THE INVENTION

In view of the above-mentioned background, it is an aspect of the present disclosure to provide a touch/display driving circuit capable of performing a display operation and a touch operation stably regardless of the type of input power, and a device including the same.

In accordance with an aspect, the present disclosure may provide a power circuit including: a multiplexer connected to a first power line and a second power line, and configured to select and output one of a first voltage supplied through the first power line or a second voltage supplied through the second power line; and a first power circuit configured to generate a first driving voltage and a second driving voltage by using a voltage supplied from the multiplexer, recognize whether there is the first voltage supplied through the first power line, and not output the first driving voltage when the first voltage is not recognized.

In accordance with another aspect, the present disclosure may provide a touch sensing circuit including: a multiplexer connected to a first line to receive a main voltage and connected to a second line to receive a sub-voltage; a power management circuit configured to receive one voltage which the multiplexer selects and output from among the main voltage and the sub-voltage; and a touch modulation circuit connected to the power management circuit to modulate a signal transferred to a touch electrode, wherein the multiplexer is configured to change a type of a voltage selected based on a driving mode of a panel.

In accordance with another aspect, the present disclosure may provide a touch sensing circuit including: at least one buck converter configured to convert an output voltage into a voltage having a lower level than an input voltage; at least one power management circuit configured to generate a voltage and transfer the voltage to a source readout circuit or a touch modulation circuit; and at least one multiplexer configured to select one from among multiple types of input power and output the selected input power to the power management circuit, wherein the power management circuit includes a power sensing line connected to one of multiple types of input power transferred to the multiplexer, and is configured to determine a type of input power, based on a signal received through the power sensing line.

As described above, according to the present disclosure, even if main power is not input in the case of a touch sensing circuit to which two kinds of power are input, sub-power may be used to maintain normal driving of the touch operation.

In addition, the present disclosure may provide a touch function and a display function through a more simplified circuit configuration, and power consumed by the panel and the touch sensing circuit may be reduced.

DETAILED DESCRIPTION OF THE EXEMPLARY EMBODIMENTS

Figure 1:
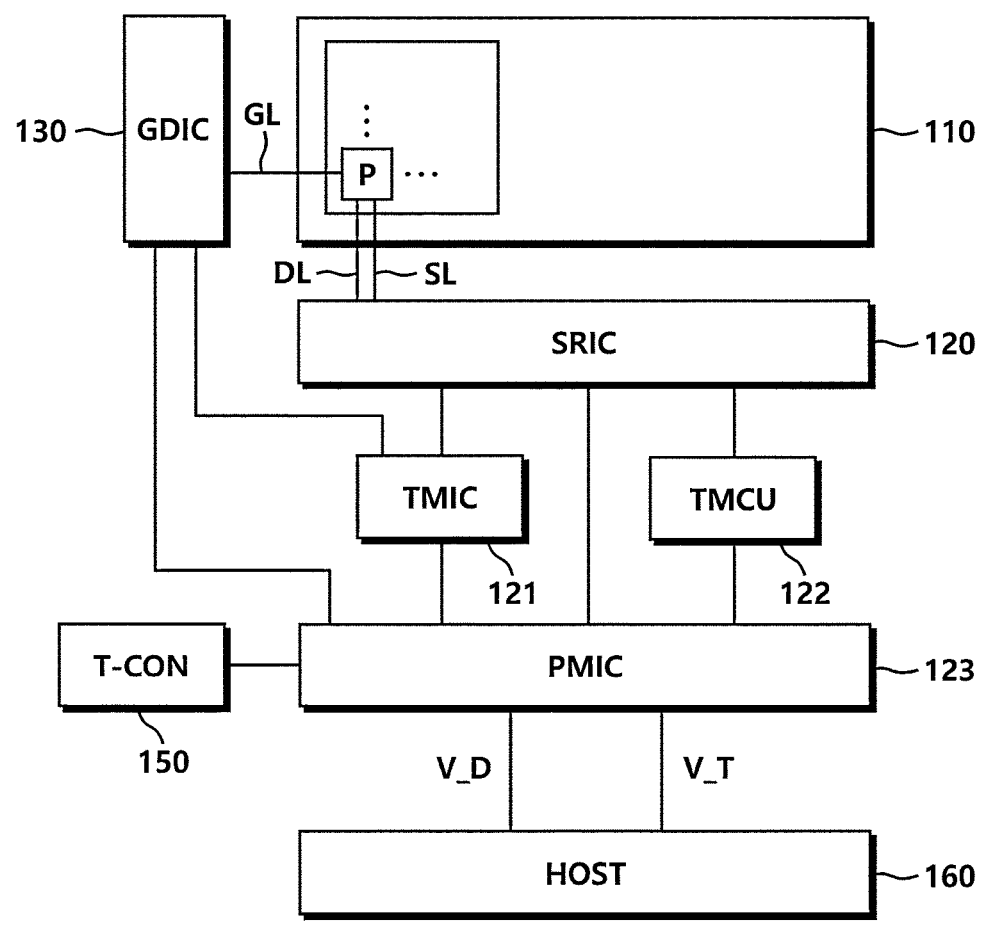
FIG. 1 illustrates the configuration of a touch sensing circuit according to an embodiment of the present disclosure.

FIG. 1 illustrates the configuration of a touch sensing circuit according to an embodiment of the present disclosure.

Referring to FIG. 1, the display device 100 may include a panel 110, a source readout IC (SRIC) 120, a touch modulation IC (TMIC) 121, a microcontroller (MCU) 122, a power management IC (PMIC) 123, a gate driving IC (GDIC) 130, a timing controller (TCON) 150, a host 160, etc.

Multiple data lines (DL) and multiple gate lines (GL) may be disposed in the panel 110, and multiple pixels (P) may be disposed therein. A pixel may include multiple sub-pixels (SP).

The panel 110 may include both a common electrode and a touch electrode so as to perform a touch function and a display function, and the common electrode and the touch electrode may be disposed by dividing one electrode. The touch electrode may sense touching or approaching of an object by using one among a mutual capacitance scheme and a self-capacitance scheme.

The source readout IC 120 may include a source driver IC (SDIC) therein. The source driver IC may supply data voltage to the sub-pixels (SP) through the data lines (DL). The data voltage supplied through the data lines (DL) may be supplied to the sub-pixels (SP) on the basis of a gate driving signal.

Further, the source readout IC 120 may include a readout IC (ROIC) therein. The readout IC may be embedded in the source readout IC 120 together with the source driver IC. The readout IC may transfer a touch driving signal to a touch electrode around a sub-pixel (SP) through a touch line (TL), and may receive touch sensing data which is the amount of a signal change of the touch electrode.

The touch modulation IC 121 may receive an output voltage from the power management IC 123, and may synchronize and modulate a voltage transferred to the source readout IC 120 during a touch driving period and a voltage transferred to a level shifter (not shown) connected to the gate driving IC 130.

In order to reduce an effect which the parasitic capacitance of a touch sensor has on the sensing result, the touch modulation IC 121 may generate a zero load driving (ZLD) signal and transmit the same to a panel and the gate driving IC 130. The zero load driving (ZLD) signal may have the same phase as a driving signal for driving the touch sensor. When the zero load driving (ZLD) signal is applied to a positive electrode of a parasitic capacitor together with a driving signal, the amount of electrical charge with which the parasitic capacitor is charged becomes 0, and thus the parasitic capacitance may disappear.

The microcontroller 122 may be connected to the source readout IC 120 so as to transmit or receive data to or from the source readout IC 120. The microcontroller 122 may transmit data for controlling the source readout IC 120 to the source readout IC 120. The source readout IC 120 may sense touching or approaching of an external object from the touch sensor to generate touch sensing data, and may transmit the touch sensing data to the microcontroller 122. The microcontroller 122 may be defined as a touch microcontroller (Touch MCU (TMCU)) or a touch control circuit.

The microcontroller 122 and the source readout IC 120 may perform communication on the basis of a serial peripheral interface (SPI) scheme or an inter-integrated circuit (I2C) scheme. In the SPI or I2C scheme, communication subjects may operate as a master or slave, wherein the microcontroller 122 may operate as a master, and the source readout IC 120 may operate as a slave.

The power management IC 123 may supply power to the panel 110, the source readout IC 120, the touch modulation IC 121, the microcontroller 122, the gate driving IC 130, and the timing controller 150. The power management IC 123 may supply power to each circuit by transmitting a driving voltage thereto through a power line, and the voltage applied to each circuit may be differently configured based on the characteristics of the circuit. The power management IC 123 may function as a power supply source for internal circuits of the display device 100.

The power management IC 123 may differently change and supply voltage, applied to each circuit, depending on the type of power input from the host 160. The power management IC 123 may include at least one booster circuit in order to increase output voltage, and may include at least one buck circuit in order to reduce output voltage.

The gate driving IC 130 may supply a gate driving signal of a turn-on voltage or a turn-off voltage through a gate line (GL). When a gate driving signal of a turn-on voltage is supplied to a sub-pixel (SP), the sub-pixel (SP) is connected to a data line (DL). Further, when a gate driving signal of a turn-off voltage is supplied to the sub-pixel (SP), the sub-pixel (SP) is disconnected from the data line (DL).

The timing controller 150 may receive image data, a timing signal, etc. from the host 160, and may supply a control signal to the gate driving IC 130 and a touch control circuit. For example, the timing controller 150 may transmit, to the gate driving IC 130, a gate control signal for starting a scan. Further, the timing controller 150 may output image data (RGB) to the microcontroller 122. Further, the timing controller 150 may transmit, to the microcontroller 122, a data control signal (DCS) which controls the source readout IC 120 to supply data voltage to each sub-pixel (SP). Further, the timing controller 150 may transmit, to the microcontroller 122, a touch control signal (TCS) which controls the source readout IC 120 to drive a touch electrode of each sub-pixel (SP) such that the touch electrode senses a touch input.

The timing controller 150 may receive a touch synchronization signal (Touch Sync Signal) from the microcontroller 122, may divide a time interval in one frame into a display driving period and a touch driving period, and may operate the source readout IC 120. The display driving period may be a period for transferring data voltage to sub-pixels of the panel 110, and the touch driving period may be a period for transferring touch driving voltage to sub-pixels of the panel 110.

The host 160 may supply at least one type of power to the power management IC 123. The power management IC 123 may generate a driving voltage from power received from the host 160, and may supply the driving voltage to the internal circuits of the display device 100, such as the panel 110, the source readout IC 120, the microcontroller 122, the touch modulation IC 121, the gate driving IC 130, and the timing controller 150. Therefore, power which the host 160 supplies to the power management IC 123 may be a source of power supplied by the power management IC 123.

When the host 160 supplies power to the power management IC 123, the host 160 may supply the power in two types of power which are main power and sub-power. The main power may be power for a circuit which involves in the display of the display device 100, and the sub-power may be power for a circuit which involves in touch sensing of the display device 100. The host 160 may provide each type of power in the form of voltage and current. The main power may approximately have a main voltage (V_D) of 5V and a display current of 2-3 A. The sub-power may approximately have a sub-voltage (V_T) of 5V and a touch current of 0.5 A or less. Power consumption in a display operation of the display device 100 is far more than power consumption in a touch operation thereof, and thus, even when voltages have the same magnitude, a display current may be higher than a touch current.

The main power and the sub-power are provided in the form of voltage and current, and thus, hereinafter, supply of the main power may be described while being replaced with supply of a main voltage or supply of a display current, and supply of the sub-power may be described while being replaced with supply of sub-voltage or supply of touch current. However, the main power and the sub-power are not limited thereto.

The power management IC 123 may process power received from the host 160 into a voltage and a current suitable for each circuit, and may supply the processed power to each circuit. The main power may be processed so as to be supplied to a circuit, which involves in display, such as the timing controller 150 or a gamma circuit, and the sub-power may be processed so as to be supplied to a circuit, which involves in touch sensing, such as the touch modulation IC 121 or the microcontroller 122. The main power and the sub-power are not limited thereto.

A signal level of a driving voltage, which the power management IC 123 generates for display driving, and a signal level of a driving voltage, which the power management IC 123 generates for touch driving, may be adjusted to be different from each other. A target to which driving voltage generated by the power management IC 123 is transferred may also be changed depending on each driving mode. For example, an operation of the power management IC 123 may be controlled through an internal control device (not shown), or may be controlled by a control signal transferred from the microcontroller 122. The power management IC 123 may select whether to control an operation, based on a reference setting value stored in an internal memory.

In the display device 100, all or some circuit elements for performing a touch operation and a display operation may be defined as a touch sensing circuit, and a circuit element for receiving power and providing power to the inside of the display device 100 may be defined as a touch power circuit.

The circuit elements in the display device 100 may be defined as a combination of all or some circuit elements which are conceptually separated from each other. For example, a power circuit (not shown) may be defined as a circuit including the entire or a part of the power management IC 123 and including another circuit element.

Figure 2:
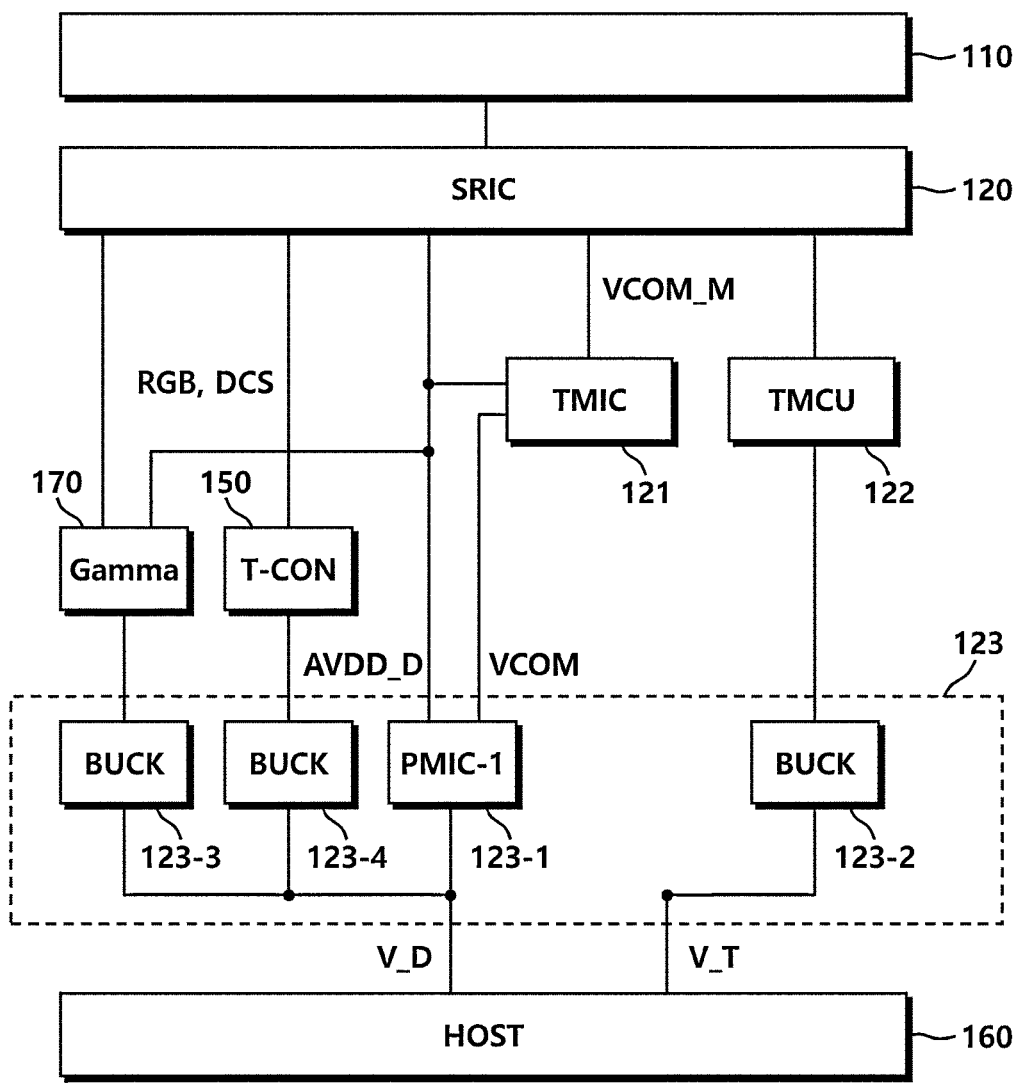
FIG. 2 illustrates, from the viewpoint of a power circuit, the configuration of a touch sensing circuit according to an embodiment of the present disclosure.

FIG. 2 illustrates, from the viewpoint of a power circuit, the configuration of a touch sensing circuit according to an embodiment of the present disclosure.

Referring to FIG. 2, the power management IC 123 may include a first power circuit 123-1, a second power circuit 123-2, a third power circuit 123-3, a fourth power circuit 123-4, etc.

The power management IC 123 may be subdivided based on functions, and the power management IC 123 may include multiple power circuits 123-1 to 123-4 therein. The multiple power circuits 123-1 to 123-4 may receive main power or sub-power to generate power, and may supply the power to circuits in the display device 100. Voltages, which the multiple power circuits 123-1 to 123-4 generate in order to supply power, may be separately defined as a first driving voltage, a second driving voltage, a third driving voltage, a fourth driving voltage, etc.

Some of the multiple power circuits 123-1 to 123-4 may drive a coupled circuit formed by integrating a display circuit and a touch circuit together. The display circuit may include a circuit which involves in a display operation of outputting image data through pixels by the display device 100, and the touch circuit may include a circuit which involves in a touch operation of sensing touching or approaching of an external object by the display device 100 through a touch electrode.

For example, the display circuit may include a gamma circuit 170 for generating a gamma voltage corresponding to a greyscale value in order to generate a data voltage corresponding to image data (RGB), a source driver IC which is included in a source readout IC 120 and outputs a data voltage, and a timing controller 150 for controlling a source driver and supplying image data (RGB). The touch circuit may include a touch modulation IC 121, which generates a touch driving voltage (VCOM_M) for driving a touch electrode, and a microcontroller 122, which controls a readout IC included in the source readout IC 120 and receives touch data to calculate touch coordinates.

The display circuit and the touch circuit may involve in one of a display operation and a touch sensing operation, but the coupled circuit may involve in both the display operation and the touch sensing operation. The coupled circuit may have a form in which the display circuit and the touch circuit are integrated together. For example, the coupled circuit may include a source readout integrated circuit (SRIC) 120 in which the source driver IC and the readout IC are integrated together.

The first power circuit 123-1 may generate a display analog voltage (AVDD_D) to drive the source readout IC 120. The first power circuit 123-1 may generate an analog voltage (Analog VDD (AVDD)) to supply power, and, in particular, may generate an analog voltage from a main voltage (V_D). The display analog voltage (AVDD_D) may imply an analog voltage generated based on the main voltage (V_D). As necessary, the analog voltage (Analog VDD (AVDD)) generated by the first power circuit 123-1 may be defined as a first voltage.

The first power circuit 123-1 may generate a common voltage (VCOM) to drive the touch modulation IC 121. The touch modulation IC 121 may generate, from the common voltage (VCOM), the touch driving voltage (VCOM_M) for driving a touch electrode. A touch modulation IC 121 may transfer the touch driving voltage (VCOM_M) to the source readout IC 120.

The second power circuit 123-2 may convert power received from a host 160 and may supply the power to the microcontroller 122. The second power circuit 123-2 may include a step-down converter or a buck converter (BUCK), which converts an output voltage into a voltage that is lower than an input voltage. For example, the second power circuit 123-2 may receive a signal having a 5V voltage of sub-power and may convert the signal into a signal having another voltage such as 1.8V or 3.3V. The second power circuit 123-2 may transmit the converted voltage to a microcontroller (microcontroller unit (MCU)) 122.

The third power circuit 123-3 may convert power received from the host 160 to supply the power to the gamma circuit 170. The third power circuit 123-3 may include a buck converter (BUCK). The third power circuit 123-3 may convert the main voltage (V_D) from the host 160, and may drive the gamma circuit 170 through the converted voltage.

The fourth power circuit 123-4 may convert power received from the host 160 to supply the power to the timing controller 150. The fourth power circuit 123-4 may include a buck converter (BUCK). The fourth power circuit 123-4 may convert the main voltage (V_D) from the host 160 and may drive the timing controller 150 through the converted voltage.

The source readout IC 120 may operate through a driving voltage transferred from the first power circuit 123-1. The source readout IC 120 may receive the display analog voltage (AVDD_D) to operate internal circuits. The source driver IC and the readout IC, which are integrated together in the source readout IC 120, may operate by using the display analog voltage (AVDD_D) as power.

The touch modulation IC 121 may provide a driving voltage to the source readout IC 120. The touch modulation IC 121 may receive the common voltage (VCOM) from the first power circuit 123-1 to generate the touch driving voltage (VCOM_M) for driving a touch electrode. Further, the touch modulation IC 121 may receive a gate low voltage (VGL) and a gate high voltage (VGH) from a power circuit (not shown) to generate a modulation gate low voltage (VGL_M) applied to the touch electrode.

The timing controller 150 may operate using power supplied from the fourth power circuit 123-4. The timing controller 150 may transmit a control signal (DCS) and image data (RGB) to control the source readout IC 120.

The gamma circuit 170 may generate a gamma voltage by using power supplied from the third power circuit 123-3. Further, the gamma circuit 170 may receive the display analog voltage (AVDD_D) from the first power circuit 123-1. An amplifier of the gamma circuit 170 may receive, through an input terminal, a voltage applied from the third power circuit 123-3, and may receive the display analog voltage (AVDD_D) through a bias terminal. The amplifier may generate a gamma voltage from the voltage of the third power circuit 123-3 and the display analog voltage (AVDD_D).

The host 160 may supply a main power or a sub-power to the power management IC 123 through a power line, and each power may be transferred to the multiple power circuits 123-1 to 123-4 in the power management IC 123. If the host 160 can supply power through an interface, the type thereof is not limited.

For example, the main voltage (V_D) may be provided to the first power circuit 123-1, the third power circuit 123-3 and the fourth power circuit 123-4 through a first power line, and a sub-voltage (V_T) may be provided to the second power circuit 123-2 through the second power line. Further, the first power circuit 123-1, the third power circuit 123-3, and the fourth power circuit 123-4 may convert the input main power to generate various types of power signals. The second power circuit 123-2 may convert the input sub-power to generate various types of power signals.

The display device 100 may operate in a normal mode, a display mode, or a sleep mode.

The normal mode may be defined as a mode in which the display device 100 performs both display driving and touch driving, the display mode may be defined as a mode in which the display device 100 performs only display driving without performing touch driving, and the sleep mode may be defined as a mode in which the display device 100 performs only touch sensing without performing display driving. In the normal mode among the operation modes of the display device, both the display circuit and the touch circuit may operate. In the display mode, the touch circuit may not operate and only the display circuit may operate. In the sleep mode, the display circuit may not operate and only the touch circuit may operate.

Each driving mode of the display device may be implemented so as to block supply of power transferred to the display circuit and the touch circuit. For example, in the normal mode, the host 160 may provide both the main voltage (V_D) and the sub-voltage (V_T). In the display mode, the host 160 may provide only the main voltage (V_D). In the sleep mode, the host 160 may provide only the sub-voltage (V_T).

When the main voltage (V_D) and the sub-voltage (V_T) are separately supplied based on each driving mode of the display device, a coupled circuit including both the display circuit and the touch circuit is not supplied with appropriate power. In particular, when the coupled circuit is supplied with only one input voltage as a source, and when this source voltage is blocked according to a mode, an operation of a partial circuit of the coupled circuit is limited.

For example, the source readout IC 120 including the source driver IC and the readout IC may be supplied with only the display analog voltage (AVDD_D) based on the main voltage (V_D) as power from only the first power circuit 123-1. If the display device 100 operates in the sleep mode, the main voltage (V_D) is blocked, and thus the circuits driven by the main voltage (V_D) may be turned off. The circuits to be turned off are a display circuit such as the timing controller 150 and the gamma circuit 170, and a circuit for supplying power to the display circuit, such as the first power circuit 123-1, but the coupled circuit including the display circuit and the touch circuit may be also turned off. Then, the readout IC may not be supplied with power even when needing to perform touch driving in the sleep mode, and thus touch sensing in the sleep mode may not be properly performed.

The power management IC 123 according to an embodiment may be maintained such that touch sensing can be performed regardless of each driving mode of the display device, and may change internal circuit elements or include a separate circuit element so as to reduce the amount of power used.

Figure 3:
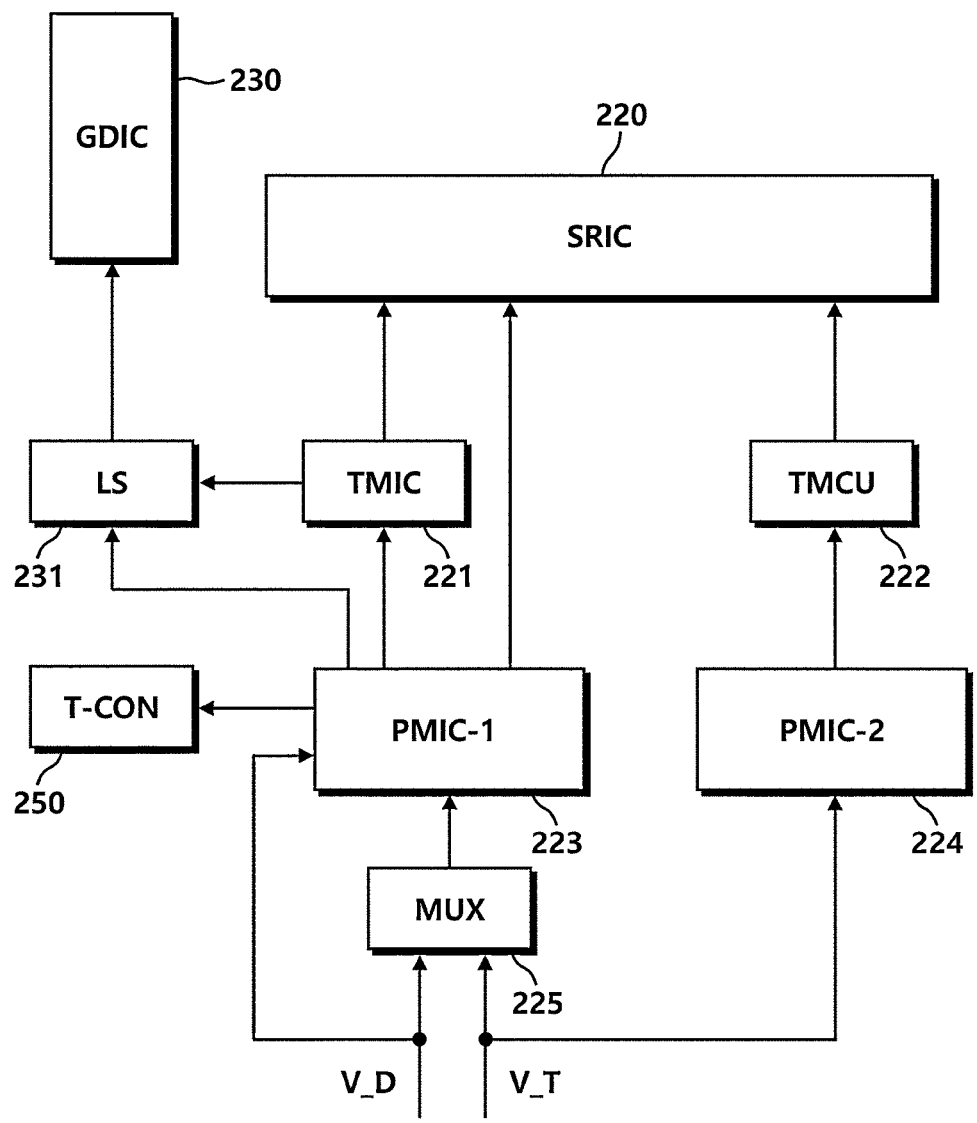
FIG. 3 is a first illustrative block diagram showing a signal flow of a touch sensing circuit according to an embodiment of the present disclosure.

FIG. 3 is a first illustrative block diagram showing a signal flow of a touch sensing circuit according to an embodiment of the present disclosure.

Referring to FIG. 3, a display device 200 may include a source readout IC 220, a touch modulation IC 221, a microcontroller 222, a first power circuit 223, a second power circuit 224, a multiplexer 225, a gate driving circuit 230, a level shifter 231, the timing controller 250, etc.

The source readout IC 220, the touch modulation IC 221, the microcontroller 222, the first power circuit 223, the second power circuit 224, the multiplexer 225, the gate driving circuit 230, the level shifter 231, and the timing controller 250 may include the above-described circuit configurations and functions in FIGS. 1 and 2, and may include even embodiments that can be changed by those skilled in the art.

The multiplexer 225 may receive a first voltage, for example, a main voltage (V_D), transferred through a first power line, and may receive a second voltage, for example, a sub-voltage (V_T), transferred through a second power line. The first voltage and the second voltage may be voltages having the same magnitude, but voltages having different magnitudes may be transferred to the multiplexer 225 as necessary.

The multiplexer 225 may select and output one of multiple analog signals which are input, and whether to operate, operation timing, the type of a selected and output signal, etc. may be controlled by a control signal from the timing controller 250 or the microcontroller 222.

Further, as necessary, the multiplexer 225 may determine a signal, which is to be selected and output, on the basis of the types and the number of input signals without receiving a separate control signal from the outside through an internal calculation device (not shown). For example, the internal calculation device (not shown) may configure a reference so as to select and output the first voltage when both the first voltage and the second voltage are transferred to the multiplexer 225, and may additionally perform a calculation for determining the type of an input signal in consideration of the intensity of the input signal, the timing thereof, the position of an input port, or the like when one of the first voltage or the second voltage is transferred.

Further, the multiplexer 225 may also determine an output signal on the basis of a predefined reference, for example, whether main power or sub-power is input, without performing a separate calculation.

The multiplexer 225 may differently change the selected type of voltage depending on driving modes of a panel. The driving modes of the panel may be divided into a normal mode, a display mode, and a sleep mode. In the normal mode, both the main power and the sub-power may be input into the multiplexer 225. In the display mode, the main power may be input into the multiplexer 225 but the sub-power may not be input thereinto. In the sleep mode, the sub-power may be input into the multiplexer 225 but the main power may not be input thereinto.

For example, when both the main power and the sub-power are input into the multiplexer 225, the multiplexer 225 or a switch circuit in the multiplexer 225 may select one type of power therefrom. In order to more stably supply power, the multiplexer 225 may first select the main power and may transfer the same to the first power circuit 223 connected thereto. In this case, display driving may be performed through the first power circuit 223, and touch driving may be performed through the second power circuit 224. The second power circuit 224 may be connected through the second power line connected to an input terminal of the multiplexer 225, and thus power can be stably supplied without being affected by whether display driving is performed.

In another example, when only the main power is input into the multiplexer 225, the multiplexer 225 or the switch circuit in the multiplexer 225 may transfer the main power to the first power circuit 223. In this case, the main power may be transferred to the first power circuit 223, and only a display operation may be performed. Further, since the sub-power is not transferred to the second power circuit 224 and a line for transferring the sub-power is separated from a line for transferring the main power, the display device may not perform a touch operation.

In another example, when only the sub-power is input into the multiplexer 225, the multiplexer 225 or the switch circuit in the multiplexer 225 may transfer the sub-power to the first power circuit 223. In this case, the sub-power is transferred to the first power circuit 223, and thus power may be supplied to the touch modulation IC 221 and the source readout IC 220. Further, the sub-power is transferred to the second power circuit 224, and thus a touch operation may be performed. A display circuit and a touch circuit may remain in a connected state without separating from each other such that the sub-power can be transferred to the first power circuit 223.

When the main power and the sub-power are transferred to the first power circuit 223 through the multiplexer 225, the continuity of power supply can be maintained, and it is possible to solve a problem of instability of power supply caused by separation between power supplied to the touch circuit and power supplied to the display circuit and a problem of excess supply of power caused by nonseparation therebetween in the conventional touch sensing circuit.

Further, multiple types of input power may be easily output by only an operation of the multiplexer 225, and thus power consumption for calculation by the microcontroller 222 and the timing controller 250 may be reduced.

The first power circuit 223 may separately recognize the main voltage ($V\_D$) and the sub-voltage ($V\_T$), and may sense and determine whether the main voltage ($V\_D$) supplied through the first power line is in an ON state or an OFF state. For example, when the main voltage ($V\_D$) and the sub-voltage ($V\_T$) are supplied as voltages having the same magnitude, the first power circuit 223 may form a separate sensing line between the first power circuit 223 and the first power line in order to determine which voltage is the main voltage ($V\_D$).

The first power circuit 223 may include an inner circuit element capable of performing calculation in order to determine the state of the main voltage ($V\_D$), for example, the magnitude of the main voltage ($V\_D$), whether there is an input, input timing, a signal waveform, etc.

When the main power is in an ON state, the first power circuit 223 may transfer a driving voltage to the gate driving circuit 230, the level shifter 231, the timing controller 250, the source readout IC 220, and the touch modulation IC 221, and may divide the driving voltage into a first driving voltage or a second driving voltage based on a target of a voltage transferred to each circuit element to selectively control an operation. For example, the first driving voltage may be a driving voltage that is transferred to at least one of the gate driving circuit 230, the level shifter 231, and the timing controller 250, and the second driving voltage may be a driving voltage that is transferred to at least one of the source readout IC 220 and the touch modulation IC 221. When the main power is in an OFF state, the first power circuit 223 may turn off (OFF) power, for example, the first driving voltage, transferred to the gate driving circuit 230, the level shifter 231, and the timing controller 250, thereby reducing the amount of power used. In this case, the first power circuit 223 may supply power, for example, the second driving voltage, only to the source readout IC 220 and the touch modulation IC 221, thereby reducing the amount of power used. The first power circuit 223 may change an operation so as to sense the ON/OFF state of the main power and output driving signals having different signal levels, and thus may effectively reduce the amount of power used for touch driving.

When the main power of the first power circuit 223 is an ON state, a display screen may be stably transmitted regardless of whether the sub-power is input. The display screen may not be transmitted only when the main power is an OFF state.

The first driving voltage and the second driving voltage refer to driving voltages transferred from the first power circuit 223, and the type of a driving voltage may be defined based on a target to which a voltage is transferred, or may be defined based on timing at which a voltage is transferred.

The driving voltage of the first power circuit 223 may be controlled by the internal calculation device (not shown), or may be controlled by the microcontroller 222. Further, the state of a driving voltage generated by the first power circuit 223 may be differently defined depending on conditions stored in an internal memory (not shown). For example, a reference stored in the memory (not shown) may be a reference for changing the size or waveform of a driving voltage, and may be a reference for determining the on/off state of a driving voltage.

Both or one of the first driving voltage and the second driving voltage may be transferred from the first power circuit 223 at the same time or at different times, and the order or method of supply of a driving voltage based on an operation of the first power circuit 223 according to the calculation result may be defined in a scheme different from the above scheme. The second power circuit 224 may supply power to the microcontroller 222 in order to maintain a touch operation. In order to reduce the amount of power consumed by the microcontroller 222, the second power circuit 224 may include at least on buck converter. A sub-voltage input by the buck converter may be changed into a lower voltage, and may be maintained as a voltage suitable for driving of the microcontroller 222.

The second power circuit 224 may directly receive the sub-power through the second power line which is connected to an input terminal of the multiplexer but not to an output terminal thereof. Therefore, it is possible to prevent power loss caused by bypass supply via the multiplexer 225 and the first power circuit 223. Further, power, which the first power circuit 223 supplies to the display circuit, and power, which the second power circuit 224 supplies to the touch circuit, may be independently managed and controlled.

In an In-Cell scheme in which a touch operation and a display operation are implemented by one panel, the touch operation and the display operation are not electrically disconnected from each other and share circuit elements. Therefore, the power circuit according to an embodiment may electrically disconnect the first power circuit from the second power circuit, and may thus stably implement the touch operation and the display operation.

When both the main voltage and the sub-voltage are input into the multiplexer 225, the microcontroller 222 or the timing controller 250 may generate a control signal for selecting and outputting the main voltage and may transfer the control signal to the multiplexer 225.

The microcontroller 222 may generate a control signal for adjusting an output voltage of the first power circuit 223, and may transfer the control signal to the first power circuit 223.

The touch modulation IC 221 may receive an output voltage of the first power circuit, and may synchronize and modulate, during a touch driving period, a voltage transferred to the source readout IC 220 and a voltage transferred to the level shifter 231 connected to the gate driving circuit 230. Operation of the source readout IC 220 and the gate driving circuit 230 may be performed at the same time or in conjunction with each other so as to have a predetermined temporal connection relationship therebetween.

Figure 4:
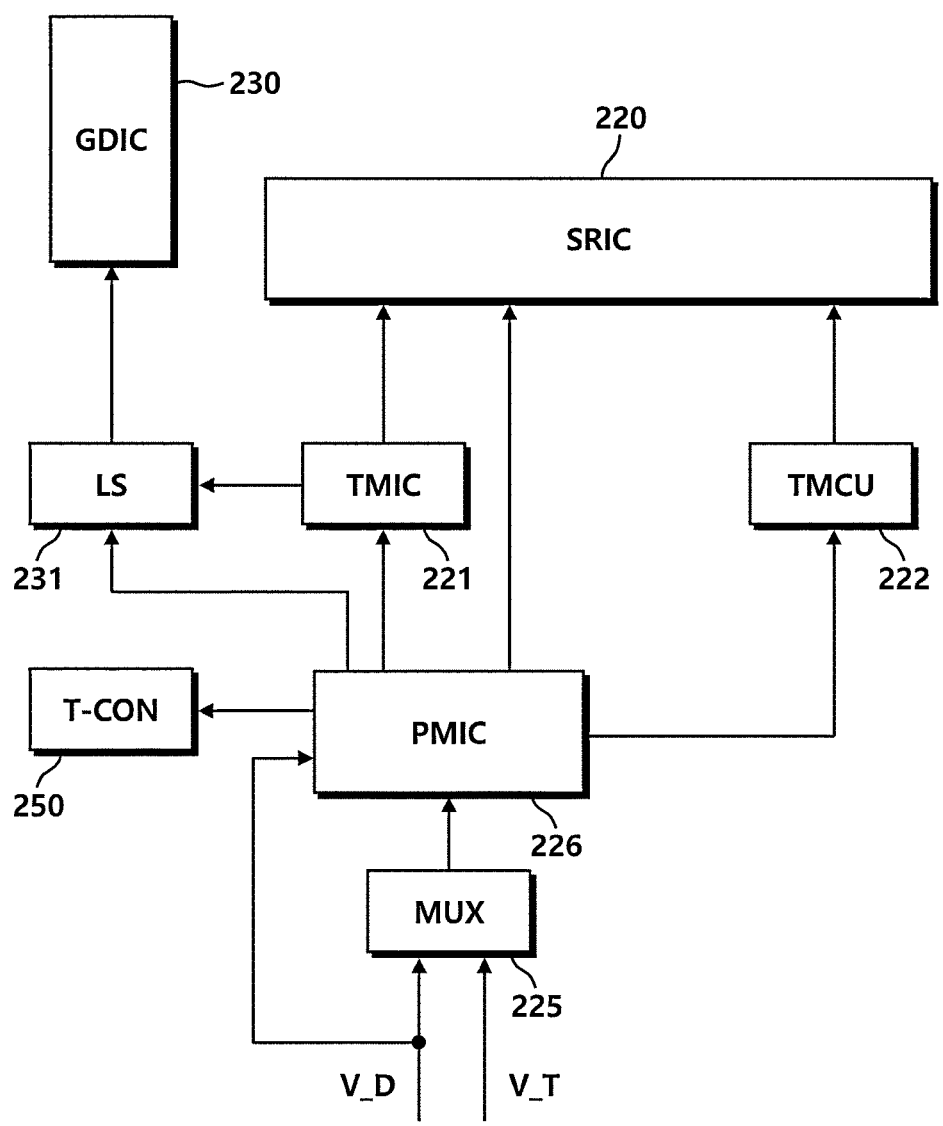
FIG. 4 is a second illustrative block diagram showing a signal flow of a touch sensing circuit according to an embodiment of the present disclosure.

FIG. 4 is a second illustrative block diagram showing a signal flow of a touch sensing circuit according to an embodiment of the present disclosure.

Referring to FIG. 4, the first power circuit 223 and the second power circuit 224, described above, may be integrated to form one power management IC 226.

The touch operation control implemented in the second power circuit 224 in FIG. 3 may be implemented through a logic circuit in the power management IC 226.

The power management IC 226 may sense, using an internal calculation processing circuit, whether the main voltage (V_D) and the sub-voltage (V_T), aside from a control signal of the microcontroller 222, are input, and, when only the main voltage (V_D) is input, may drive a source readout IC 220, a touch modulation IC 221, a gate driving circuit 230, a level shifter 231, or a timing controller 250 to perform a display operation. Further, the one integrated power management IC 226 may transfer a voltage for driving the microcontroller 222, thereby performing a touch operation too.

When both the main voltage (V_D) and the sub-voltage (V_T) are input, the multiplexer 225 may configure priority as supplying the main voltage (V_D) to the power management IC 226. The timing controller 250 may transfer information about the driving mode of panel to the multiplexer 225 for each time interval to change an output depending on an operation of the power management IC 226.

When only the sub-voltage (V_T) is input, the multiplexer 225 may output the sub-voltage (V_T) and may supply the same to the power management IC 226, and the power management IC 226 may sense that the main power (V_D) is OFF, and may change power of the gate driving circuit 230, the level shifter 231, or the timing controller 250 to OFF or may maintain the power thereof. The power management IC 226 may change power of the source readout IC 220, the touch modulation IC 221, or the microcontroller 222 to ON or may maintain the power thereof. A total power consumption of the display device 200 may be reduced by maintaining display-related circuits in an OFF state.

Figure 5:
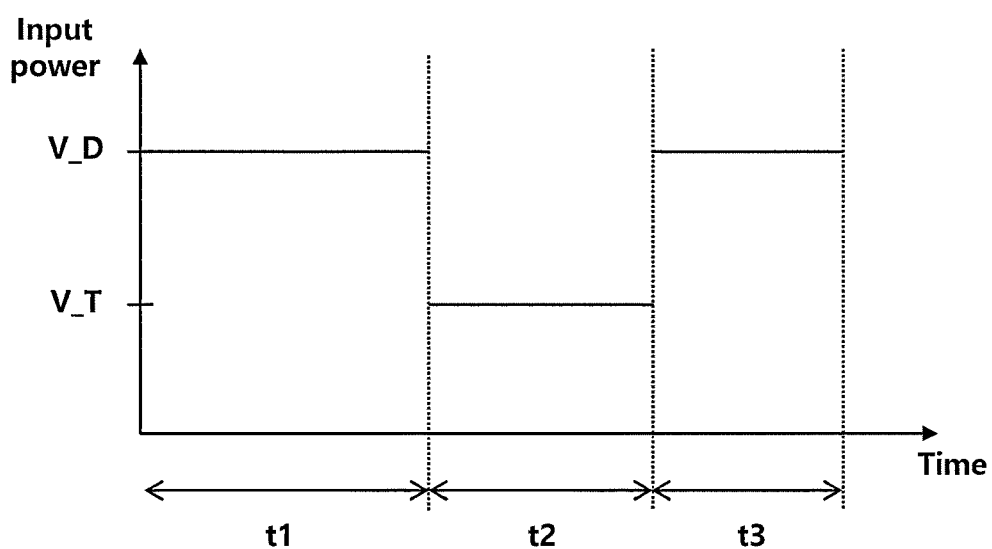
FIG. 5 is a timing diagram illustrating a change in input power of a power management IC according to an embodiment of the present disclosure.

FIG. 5 is a timing diagram illustrating a change in input power of a power management IC according to an embodiment of the present disclosure.

Referring to FIG. 5, the type of power transferred to the power management IC may be changed depending on each time interval.

In order to select one from among multiple types of input power transferred from an external system, a multiplexer (not shown) may be connected to the front end of a power management IC (not shown), and, in a first time interval t1, a main voltage (V_D) may be transferred.

The power management IC (not shown) or a touch control circuit (not shown) may monitor the type of input power for each time interval, and may maintain the state of a previous time interval when input power is not changed. If the state of input power to be monitored, for example, the main power, is changed, the multiplexer (not shown) may change input power transferred to the power management IC.

In a second time interval t2, a sub-voltage (V_T) may be selected as an output voltage of the multiplexer (not shown) and may be transferred to the power management IC. As in the first time interval t1, input power may also be monitored in the second time interval (t2).

In a third time interval t3, the main voltage (V_D) may be selected as an output voltage of the multiplexer (not shown) and may be transferred to the power management IC.

During the first time interval t1 to the third time interval t3, in relation to an operation of the multiplexer, the above-described operation of the multiplexer in FIGS. 1 to 4 may be performed.

Figure 6:
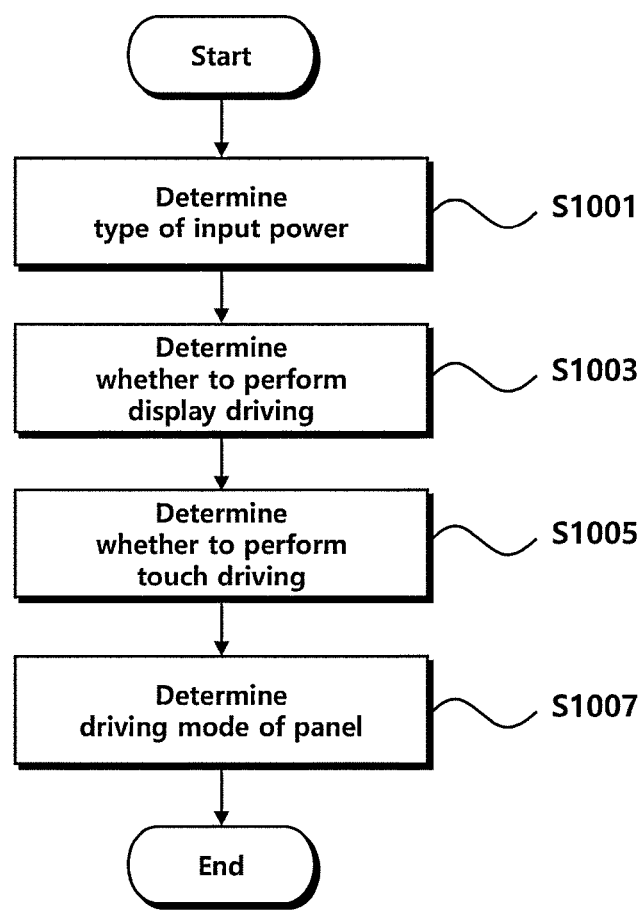
FIG. 6 is a diagram illustrating a method for determining an operation mode of a panel according to an embodiment of the present disclosure.

FIG. 6 is a diagram illustrating a method for determining an operation mode of a panel according to an embodiment of the present disclosure.

Referring to FIG. 6, a method 1000 for determining the operation mode of a panel may include a step (S1001) of determining the type of power input, a step (S1003) of determining whether to perform display driving, a step (S1005) of determining whether to perform touch driving, a step (S1007) of determining the driving mode of a panel, or the like, and the order of the steps may be changed.

In the step (S1001) of determining the type of power input, the type and the state (for example, the intensity of a voltage and a current) of power transferred to a power management IC (not shown) or a multiplexer (not shown) may be determined. For example, the power management IC (not shown) may determine whether a first voltage transferred through a first power line is input.

In the step (S1003) of determining whether to perform display driving, whether to perform display driving may be determined based on the type and the state (for example, the intensity of a voltage and a current) of power transferred to the power management IC (not shown) or the multiplexer (not shown). The power management IC (not shown) may differently configure whether to perform display driving, depending on when only main power is input, when only sub-power is input, or when the main power and the sub-power are simultaneously input. For example, when the main power is transferred to the power management IC (not shown) or the multiplexer (not shown), display driving may be performed.

In the step (S1005) of determining whether to perform touch driving, whether to perform touch driving may be determined by determining whether the sub-power is input. The power management IC (not shown) may perform touch driving when the sub-power is input.

In the step (S1007) of determining the driving mode of a panel, the driving mode of a panel, for example, a normal mode, a display mode, or a sleep mode, may be configured based on the type and state of power transferred to the power management IC (not shown) or the multiplexer (not shown). The driving mode of a panel may be defined based on the type of input power. However, conversely, the type of input power may be differently adjusted based on the driving mode of a panel.

Figure 7:
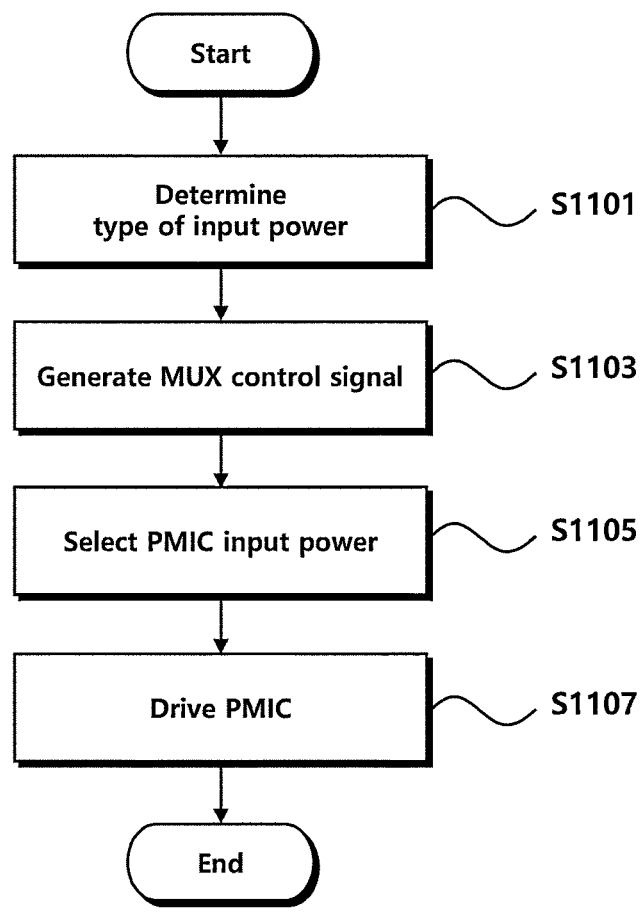
FIG. 7 is a diagram illustrating a method for determining an operation of a power management IC according to an embodiment of the present disclosure.

FIG. 7 is a diagram illustrating a method for determining an operation of a power management IC according to an embodiment of the present disclosure.

Referring to FIG. 7, a method 1100 for determining an operation of a power management IC may include a step (S1101) of determining the type of power input, a step (S1103) of generating a multiplexer control signal, a step (S1105) of selecting input power of the power management IC, a step (S1107) of driving the power management IC, etc.

The step (S1101) of determining the type of power input may be a step of determining the type of power input into a multiplexer (not shown), for example, main power and sub-power.

The step (S1103) of generating a multiplexer control signal may be a step of generating a signal for controlling an operation of the multiplexer by a microcontroller (not shown) or a timing controller (not shown).

The step (S1105) of selecting input power of the power management IC may be a step of controlling an output voltage of the multiplexer on the basis of the above-described signal for controlling an operation of the multiplexer by the microcontroller (not shown) or the timing controller (not shown), and transferring the output voltage to the power management IC.

The step (S1107) of driving the power management IC may be a step of driving the power management IC by turning on (ON) or turning off (OFF) power input into a source readout IC, a touch modulation IC, a level shifter, a timing controller, a microcontroller, etc. which are connected based on the type and state of input power, or by changing the phase of a voltage or timing.

Figure 8:
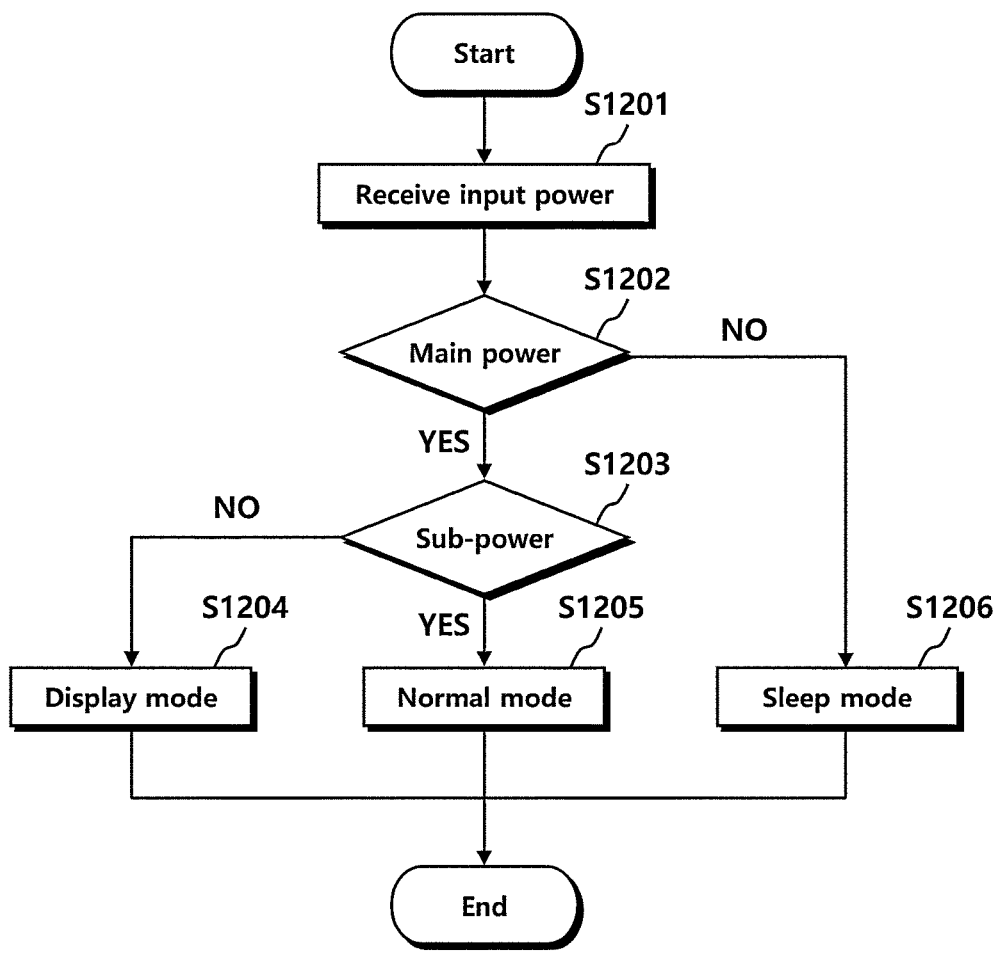
FIG. 8 is a diagram illustrating a method for dividing an operation mode of a panel according to an embodiment of the present disclosure.

FIG. 8 is a diagram illustrating a method for dividing an operation mode of a panel according to an embodiment of the present disclosure.

Referring to FIG. 8, a method 1200 for dividing the driving mode of a panel may include a step (S1201) of receiving input power, a step (S1202) of determining whether main power is input, a step (S1203) of determining whether sub-power is input, etc., and may be a calculation performed in a touch power circuit (not shown) or a microcontroller (not shown).

The step (S1201) of receiving input power may be a step of receiving multiple types input power through multiple power lines. At least one buck circuit, at least one power management IC, and at least one multiplexer may be connected in sequence or in parallel to receive input power.

The step (S1202) of determining whether main power is input may be a step of determining whether there is main power transferred to the power management IC (not shown) or the multiplexer (not shown) and, when the main power is not input, configuring the driving mode of a panel as a sleep mode.

The step (S1203) of determining whether sub-power is input may be a step of determining whether there is sub-power transferred to the power management IC (not shown) or the multiplexer (not shown) and, when the sub-power is not input, configuring the driving mode of a panel as a display mode. If the sub-power is input, the driving mode of a panel may be determined to be a normal mode.

The step (S1203) of determining whether sub-power is input may be a step of performing determination only when the main power is input. However, the order of determining whether the main power is input and determining whether the sub-power is input is not limited thereto.

In a display mode (S1204), in relation to operation of the panel, only display operation may be performed but a touch operation may not be performed.

In a normal mode (S1205), in relation to operation of the panel, both the display operation and the touch operation may be performed.

In a sleep mode (S1206), in relation to operation of the panel, only touch operation may be performed but the display operation may not be performed.

Information about the display mode (S1204), the normal mode (S1205), and the sleep mode (S1206) may be stored in a microcontroller (not shown) or a timing controller (not shown), and may be used to control an operation of each circuit or to control a power input operation.

What is claimed is:
1. A power circuit comprising:
a multiplexer connected to a first power line and a second power line and configured to select and output one of a first voltage supplied through the first power line and a second voltage supplied through the second power line;
a first power circuit configured to generate a first driving voltage and a second driving voltage by using a voltage supplied from the multiplexer, to recognize whether there is the first voltage supplied through the first power line, and not to output the first driving voltage when the first voltage is not recognized; and a second power circuit connected to the second power line and configured to change a voltage transferred to a microcontroller (MCU), wherein a driving mode of a panel comprises a normal mode, a display mode and a sleep mode, wherein the first voltage is input into the multiplexer through the first power line and the second voltage is input into the multiplexer and the second power circuit through the second power line in the normal mode, wherein the first voltage is input into the multiplexer through the first power line but the second voltage is not input into the multiplexer and the second power circuit through the second power line in the display mode, and wherein the second voltage is input into the multiplexer and the second power circuit through the second power line but the first voltage is not input into the multiplexer through the first power line in the sleep mode.

2. The power circuit of claim 1, wherein the second power line connected to the second power circuit is connected to an input terminal of the multiplexer and the second power circuit comprises a buck converter configured to change an output voltage to be lower than a voltage of an input signal.

3. The power circuit of claim 1, wherein the first power circuit is configured to transfer a display driving voltage to a source readout circuit when the first voltage is input.

4. The power circuit of claim 3, wherein the first power circuit is configured to transfer a touch driving voltage having a magnitude different from that of the display driving voltage to a source readout circuit when the second voltage is input.

5. The power circuit of claim 1 further comprising a touch modulation circuit configured to receive an output voltage of the first power circuit and synchronize to modulate, during a touch driving period, a voltage transferred to the source readout circuit and a voltage transferred to a level shifter connected to a gate driving circuit.

6. The power circuit of claim 1 further comprising a touch control circuit configured to generate a signal for controlling the multiplexer, wherein the touch control circuit is configured to, when both the first voltage and the second voltage are input into the multiplexer, generate a multiplexer control signal for selecting the first voltage and outputting the first voltage to the first power circuit.

7. The power circuit of claim 1, wherein the multiplexer further comprises an internal calculation device configured to generate a control signal for selecting one from among the first voltage or the second voltage based on a predetermined reference.

8. A touch sensing circuit comprising:
a multiplexer connected to a first line to receive a main voltage and connected to a second line to receive a sub-voltage;
a power management circuit configured to receive one that the multiplexer selects and outputs from among the main voltage and the sub-voltage and to determine whether the main voltage is input;
a touch modulation circuit connected to the power management circuit to modulate a signal transferred to a touch electrode on a panel; and
a buck converter connected to the second line and configured to step down the level of the sub-voltage, and to transfer the stepped-down sub-voltage to a microcontroller,
wherein the multiplexer is configured to change a type of a voltage selected based on a driving mode of the panel, wherein the driving mode of the panel comprises a normal mode, a display mode and a sleep mode, wherein the main voltage is input into the multiplexer through the first line and the sub-voltage is input into the multiplexer and the buck converter through the second line in the normal mode, wherein the main voltage is input into the multiplexer through the first line but the sub-voltage is not input into the multiplexer and the buck converter through the second line in the display mode, and wherein the sub-voltage is input into the multiplexer and the buck converter through the second line but the main voltage is not input into the multiplexer through the first line in the sleep mode.

9. The touch sensing circuit of claim 8 further comprising a level shifter configured to receive a voltage from the touch modulation circuit or the power management circuit and to adjust the level of a voltage transferred to the gate driving circuit.

10. The touch sensing circuit of claim 8 further comprising a touch control circuit connected to the power management circuit and configured to control an operation of the power management circuit or the multiplexer.

11. The touch sensing circuit of claim 8, wherein the power management circuit is configured to
determine whether the main power or the sub-power is input, and
transfer a common voltage for inducing a display operation to a source readout circuit when the main power is input, and
transfer a touch driving voltage for inducing a touch operation to the source readout circuit when the sub-power is input.

12. A touch sensing circuit comprising:
at least one buck converter connected to a second power line to receive a sub-power and configured to convert an output voltage to have a level lower than that of an input voltage;
at least one power management circuit configured to generate a voltage and to transfer the voltage to a source readout circuit or a touch modulation circuit; and
at least one multiplexer connected to a first power line to receive a main power and the second power line and configured to select one of the main power and the sub-power and to output the selected input power to the power management circuit,
wherein the power management circuit comprises a power sensing line connected to one of multiple types of input power transferred to the multiplexer and is configured to determine the type of input power based on a signal received through the power sensing line,
wherein a driving mode of a panel comprises a normal mode, a display mode and a sleep mode,
wherein the main power is input into the multiplexer through the first power line and the sub-power is input into the multiplexer and the buck converter through the second power line in the normal mode,
wherein the main power is input into the multiplexer through the first power line but the sub-power is not input into the multiplexer and the buck converter through the second power line in the display mode, and
wherein the sub-power is input into the multiplexer and the buck converter through the second power line but the main power is not input into the multiplexer through the first power line in the sleep mode.

13. The touch sensing circuit of claim 12, wherein the at least one buck converter is configured to receive one of the multiple types of input power to generate and transfer a driving voltage for a touch control circuit.

14. The touch sensing circuit of claim 12 further comprising a timing controller connected to the power management circuit to transfer to the power management circuit information about a driving mode of a panel for each time interval.

15. The touch sensing circuit of claim 12, wherein the power management circuit is configured to supply power to the source readout circuit and to the touch modulation circuit when the main power among input power transferred to the multiplexer is in an OFF state.

16. The touch sensing circuit of claim 12,
wherein the power management circuit is configured to output a voltage for display driving when the main power is input and to output a voltage for touch driving when the sub-power is input.

17. The touch sensing circuit of claim 12, wherein the input power received through the power sensing line comprises a main power and an operation of the multiplexer is linked with an operation of the power management circuit.

* * * * *